(12) United States Patent
Seger et al.

(10) Patent No.: US 7,935,928 B2
(45) Date of Patent: May 3, 2011

(54) DEVICE AND METHOD FOR PRODUCING IMAGES

(75) Inventors: Ulrich Seger, Warmbronn (DE); Jens Schick, Herrenberg (DE)

(73) Assignee: Robert Bosch GmbH, Stuttgart (DE)

( * ) Notice: Subject to any disclaimer, the term of this patent is extended or adjusted under 35 U.S.C. 154(b) by 159 days.

(21) Appl. No.: 10/544,959

(22) PCT Filed: Dec. 19, 2003

(86) PCT No.: PCT/DE03/04249
§ 371 (c)(1),
(2), (4) Date: May 4, 2006

(87) PCT Pub. No.: WO2004/071074
PCT Pub. Date: Aug. 19, 2004

(65) Prior Publication Data
US 2007/0023660 A1    Feb. 1, 2007

(30) Foreign Application Priority Data
Feb. 7, 2003   (DE) ................................ 103 05 010

(51) Int. Cl.
*H01L 25/00* (2006.01)
(52) U.S. Cl. ........................................... 250/330
(58) Field of Classification Search ............... 250/332, 250/341.8
See application file for complete search history.

(56) References Cited

U.S. PATENT DOCUMENTS

| | | | | |
|---|---|---|---|---|
| 3,727,061 A | * | 4/1973 | Dworkin | 398/98 |
| 3,947,119 A | * | 3/1976 | Bamberg et al. | 356/5.04 |
| 4,294,544 A | * | 10/1981 | Altschuler et al. | 356/610 |
| 4,501,961 A | * | 2/1985 | Stauffer | 356/4.03 |
| 4,708,473 A | * | 11/1987 | Metzdorff et al. | 356/5.04 |
| 4,867,570 A | * | 9/1989 | Sorimachi et al. | 356/603 |
| 5,003,166 A | * | 3/1991 | Girod | 250/201.4 |
| 5,029,967 A | * | 7/1991 | Livezey et al. | 385/37 |
| 5,175,601 A | * | 12/1992 | Fitts | 356/604 |
| 5,225,876 A | * | 7/1993 | Lux et al. | 396/109 |
| 5,386,410 A | * | 1/1995 | Nagasaki et al. | 369/275.4 |
| 5,436,710 A | * | 7/1995 | Uchiyama | 399/336 |

(Continued)

FOREIGN PATENT DOCUMENTS

DE            40 08 646       10/1990

(Continued)

OTHER PUBLICATIONS

DE4107850, English translation for European Patent Office.*

(Continued)

*Primary Examiner* — David P Porta
*Assistant Examiner* — Djura Malevic
(74) *Attorney, Agent, or Firm* — Kenyon & Kenyon LLP

(57) ABSTRACT

A method and a device for generating images in a motor vehicle are provided. An infrared-sensitive camera generates images of the surroundings of the motor vehicle. An emission source emitting in the near infrared spectral region is used for the pulsed illumination of sub-ranges of the image recording region of the camera. The camera generates the images by recording partial image regions. To record the partial image regions, a synchronization in time is carried out with the pulsed illumination of the sub-range including at least the partial image region. In the preferred exemplary embodiment, the recording of partial image regions of an infrared-sensitive CMOS camera is synchronized in time with a laser diode array emitting in the near infrared spectral region.

17 Claims, 3 Drawing Sheets

U.S. PATENT DOCUMENTS

| | | | |
|---|---|---|---|
| 5,515,156 A * | 5/1996 | Yoshida et al. | 356/5.01 |
| 5,669,174 A * | 9/1997 | Teetzel | 42/115 |
| 5,675,407 A * | 10/1997 | Geng | 356/147 |
| 5,726,443 A * | 3/1998 | Immega et al. | 250/227.2 |
| 5,852,672 A * | 12/1998 | Lu | 382/154 |
| 6,154,279 A * | 11/2000 | Thayer | 356/602 |
| 6,160,479 A * | 12/2000 | Åhlen et al. | 340/555 |
| 6,377,353 B1 * | 4/2002 | Ellis | 356/603 |
| 6,420,704 B1 * | 7/2002 | Berenz et al. | 250/330 |
| 6,809,870 B2 * | 10/2004 | Fohl et al. | 359/627 |
| 2002/0016631 A1 * | 2/2002 | Marchitto et al. | 623/7 |
| 2003/0034462 A1 * | 2/2003 | Remillard et al. | 250/559.38 |
| 2003/0155514 A1 * | 8/2003 | Remillard et al. | 250/341.8 |

FOREIGN PATENT DOCUMENTS

| | | |
|---|---|---|
| DE | 41 07 850 | 6/1992 |
| DE | 42 43 200 | 1/1996 |
| DE | 102 26 278 | 12/2003 |
| EP | 0 435 011 | 7/1991 |
| JP | 2000193601 | 7/2000 |
| JP | 2002274258 | 9/2002 |

OTHER PUBLICATIONS

Hosticka et al., *CMOS Imaging for Automotive Applications*, IEEE Transactions on Electron Devices, IEEE Inc., NY, vol. 50, No. 1, Jan. 2003, pp. 173-83.

* cited by examiner

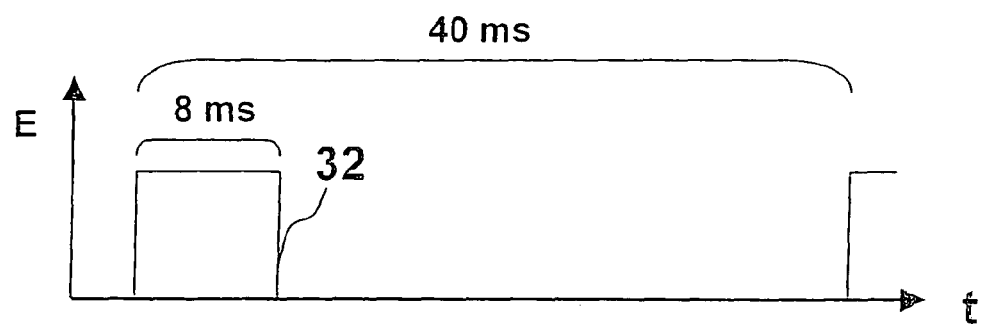
Fig. 3a
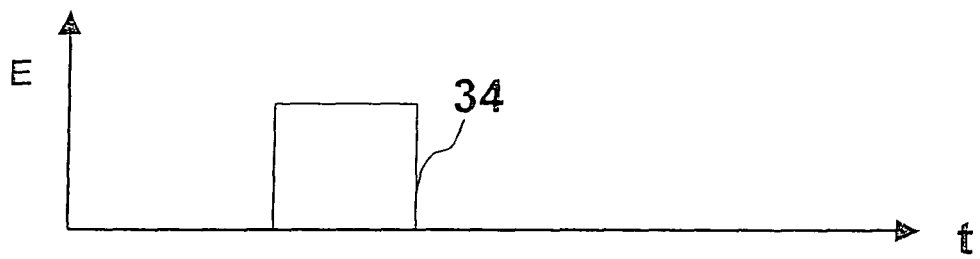
Fig. 3b
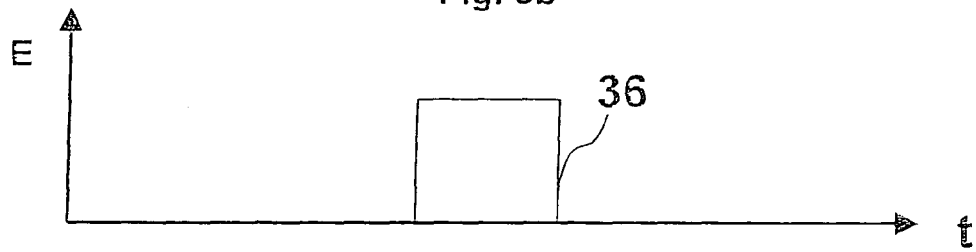
Fig. 3c
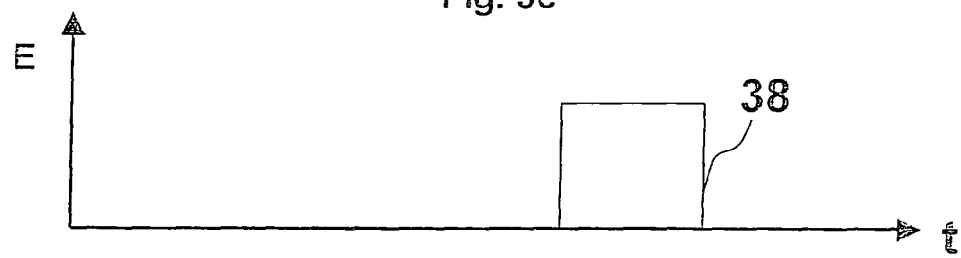
Fig. 3d
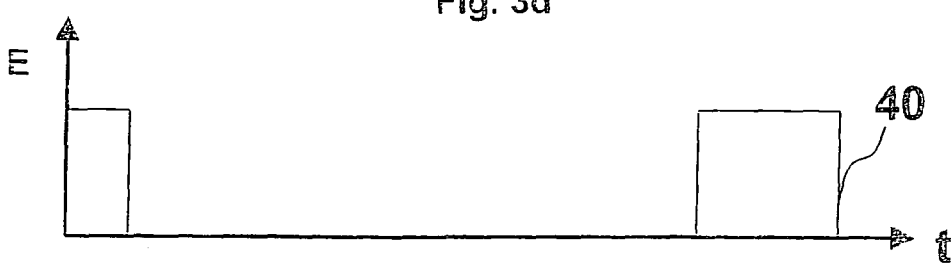
Fig. 3e
Fig. 3

DEVICE AND METHOD FOR PRODUCING IMAGES

BACKGROUND INFORMATION

During night driving in a motor vehicle, the reduced range of vision caused by the limited reach of the passing beam places heightened requirements on the driver. Because of the introduction of gas discharge headlights having greater light emission, in recent times, better illumination of the roadway has been achieved, compared to usual headlights. However, the visual range is even limited when using these new headlights, and therefore, to improve vision, it is planned to use night vision systems in motor vehicles.

Both passive and active night vision systems are known. Passive night vision systems are made up of a heat image camera. The disadvantage of night image systems is that it is difficult to produce images that are true to life, using a heat image camera. By contrast, active night vision systems are made up of an infrared emitting illumination unit, such as a halogen light having a filter, and one or more infrared-sensitive cameras. The illumination unit irradiates the vehicle's near field in the high beam region and the cameras photograph the reflected infrared high beam and reproduce the image on a monitor or a head-up display. In this context, headlights may be used for the visible passing beam and high beam to emit infrared light. However, the motor vehicle industry is increasingly planning proportionately to replace infrared-emitting halogen headlights with infrared-free xenon headlights. By their doing this, the use of additional infrared-emitting radiation sources becomes necessary. As the additional infrared-emitting radiation sources, the use of infrared-emitting lasers is possible, for example.

German Patent No. 42 43 200 describes a device for friend/foe identification of ground vehicles for military applications. In order to make visible occulted signatures for friend/foe identification, a heat image camera is linked to a $CO_2$ laser. An observer emits a single light pulse and the infrared camera receives the reflected signal in synchronized fashion. A disadvantage of this device is that heat image cameras do not deliver true-to-life images. What is missing in German Patent No. 42 43 200 is any hint at a device or a method for generating images that are true to life and would be suitable for use in motor vehicles.

SUMMARY OF THE INVENTION

The device and the method, described below, for image generation in a motor vehicle, using at least one infrared-sensitive camera, images of the surroundings of the motor vehicle being generated, has the advantage that true-to-life images having high image quality are generated in response to both good and bad visibility conditions and/or weather conditions. The device and the method for generating images may, because of the high image quality of the images generated, in an especially advantageous manner contribute to a reduction in accident numbers during bad visibility conditions, especially by night. The generation of true-to-life images having a high image quality at poor visibility conditions and/or weather conditions is also achieved because the illumination of the image-recording range using an emission source that emits at least in the near infrared spectral range is not significantly interfered with by rain or snow.

It is advantageous that the service life of the at least one emission source emitting at least in the infrared spectral range is increased by the pulsed light output. In response to a pulsed operation, at the same output, a lower thermal load of the emission source occurs in comparison to constant operation, since the emission source is able to regenerate itself during the pauses between pulses. This directly leads to an increase in service life. A longer service life of the emission source, and longer replacement intervals connected therewith, contribute in an advantageous manner to a reduction in operating costs in a motor vehicle.

Particularly advantageous is at least one infrared-sensitive CMOS camera for generating at least one image of the surroundings of the motor vehicle. As opposed to other camera types, in CMOS cameras the blooming effect is reduced. By blooming, in this context, is understood halation of the generated image by glare having strong light sources. Furthermore, it is possible to use CMOS cameras having a linear or logarithmic characteristics curve of the exposure sensitivity. The logarithmic characteristics curve makes possible generation of images having high image quality even at great dynamic range of brightness within the image recording range. A large dynamic range of brightness occurs in a motor vehicle, for instance, when the motor vehicle enters a tunnel from a sunlit road.

In many countries, legal regulations establish the admissible properties of emission sources in motor vehicles. For example, the maximum average emission intensity or light intensity of emission sources in motor vehicles is specified. Emission intensity is understood to mean the radiant flux per solid angle in units of Watt/sterad. By contrast, the light intensity is a physiological variable that determines the light flux per solid angle. The unit of light intensity is the candela. In an especially advantageous manner, the device and the method described below, because of the pulsed illumination of sub-ranges of the image recording range of the camera, lead to an increase in the intensity of radiation within the sub-range, while keeping to the legally prescribed average radiation intensities of the emission source. Overall, this leads to a more intensive illumination of the image recording range of the infrared-sensitive camera. This measure may contribute to an increase in the image quality of the generated image. In reverse, it is possible to reduce the electrical power input of the emission source at a power per area observed that remains constant. This advantageously contributes to an energy saving in the motor vehicle.

By at least one laser diode array emitting at least in the near infrared emission range and/or a laser array that emits at least in the infrared spectral range, it is possible, in an especially advantageous manner, to produce the pulsed illumination of sub-ranges of the image recording ranges of the at least one infrared-sensitive camera, in a simple manner. For example, by a short response behavior, laser diodes make it possible to generate short light pulses at a simultaneously high intensity of radiation during the light pulse duration. Furthermore, infrared-radiating laser diodes and/or infrared-radiating lasers have the advantage that the laser light has a low spectral bandwidth. By appropriate band-pass filters in front of the at least one infrared-sensitive camera it is thereby possible to filter out other spectral ranges. For example, in the case of oncoming motor vehicles which, for instance, are traveling at night, using passing lights, it is thereby possible to filter out this visible passing light that interferes with the image generation. Thus, the use of at least one laser array and/or at least one laser diode array contributes to the generation of images having a high image quality. Besides that, infrared-emitting lasers and/or infrared-emitting laser diodes have the advantage that they have a high efficiency. Because of the pulsed illumination of sub-ranges of the image range of the infrared-sensitive camera, the duty cycle of the laser diodes and/or the laser are reduced. By duty cycle is meant the time of the light output with respect to the overall operating time of an illuminating means.

The recording of scanning lines and/or scanning columns by the infrared-sensitive camera as partial image regions is advantageous. By a diminution of the recorded partial image regions to the size of individual scanning lines and/or scanning columns, it is possible to diminish the pulse-wise illuminated associated sub-regions correspondingly. Thereby, in an advantageous manner, the increase in the intensity of radiation explained above is made possible while observing legal regulations. This advantage is achieved, in the first place, in that in each case only individual sub-ranges are illuminated, while the remaining sub-ranges are not illuminated. Furthermore, modern cameras require only a few nanoseconds for the sampling process of a scanning line and/or a scanning column. Because of this short pulsed and spatially restricted illumination, it is possible to further increase the intensity of radiation, that is, the radiant flux per solid angle. Both effects contribute to a substantial increase in the intensity of radiation of the illuminated sub-range in response to the recording of the partial image region as scanning line and or scanning column. This, in turn, contributes to an improvement overall in the image quality of the image generated.

It is of advantage if, during the recording of the partial image regions, essentially the corresponding sub-range of the image recording range of the at least one infrared-sensitive camera is illuminated in a pulsed manner. This avoids unnecessary illumination of regions of the image recording range that were not recorded. This yields two important advantages. On the one hand, this contributes to energy savings in the motor vehicle, since non-recorded regions are not illuminated. On the other hand, it is possible to increase the intensity of radiation of a sub-range at the same average intensity of radiation.

One variant of the device and the method is advantageous in which at least one sub-range of the image recording range of the at least one infrared-sensitive camera includes at least two partial image regions The combination of partial image regions to one illuminated sub-range contributes to a simple and cost-effective construction of the emission source.

One variant of the device and of the method, that is described below, has particular advantages in that the recording of the partial image regions may be displaced in time with respect to the pulsed illumination. Thereby it is possible, for example, to adjust running time effects of the radiation from the light pulse output to the detection by the camera. This contributes to images having high image quality.

What is especially advantageous is an infrared-sensitive camera, particularly an infrared-sensitive CMOS camera, having means for carrying out all, or at least the essential steps of the method described for image generation in a motor vehicle. The advantages of such an infrared-sensitive camera are the described advantages of the method and the device for generating images in a motor vehicle.

BRIEF DESCRIPTION OF THE DRAWINGS

FIG. 3 shows a time diagram of the preferred exemplary embodiment.

DETAILED DESCRIPTION

A method and a device for generating images in a motor vehicle are described below. An infrared-sensitive camera generates images of the surroundings of the motor vehicle. An emission source emitting in the near infrared spectral region is used for the pulsed illumination of sub-ranges of the image recording region of the camera. The camera generates the images by recording partial image region s. To record the partial image regions, a synchronization in time is carried out with the pulsed illumination of the sub-range including at least the partial image region. In the preferred exemplary embodiment, the recording of partial image regions of an infrared-sensitive CMOS camera is synchronized in time with a laser diode array emitting in the near infrared spectral region.

Figure 1:
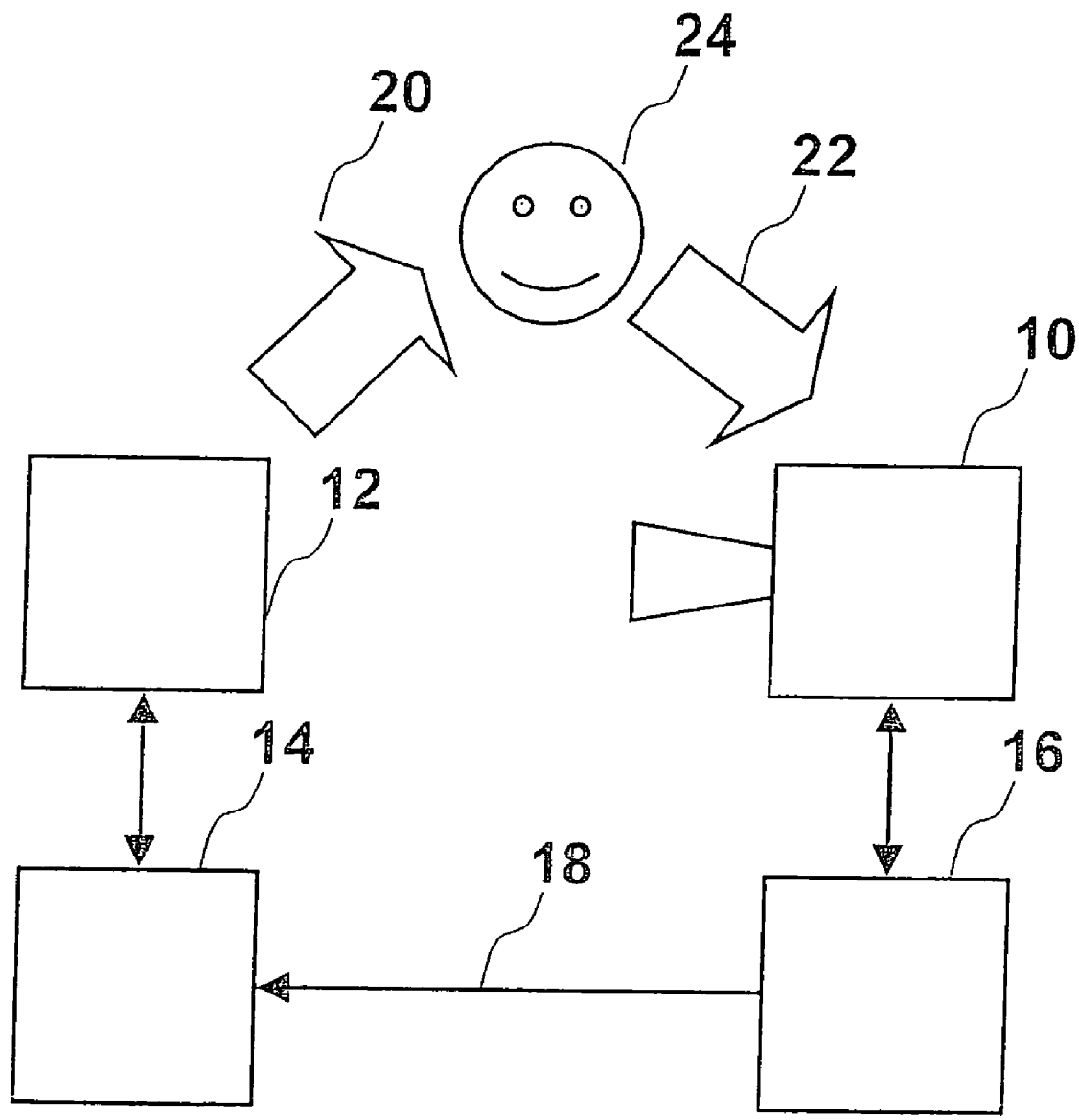
FIG. 1 shows a general plan of the preferred exemplary embodiment.

FIG. 1 shows a general plan drawing of the device for generating images in a motor vehicle of the preferred exemplary embodiment, made up of an infrared-sensitive camera 10 having a control unit/processing unit 16 and an emission source 12 that emits in the near infrared spectral region having a control unit 14.

Control unit/processing unit 16 of infrared-sensitive camera 10 and control unit 14 of emission source 12 are connected to each other via a signal line 18. Emission source 12 generates infrared radiation 20 in the near infrared spectral region for the pulsed illumination of the surroundings 24 of the motor vehicle. In this context, emission source 12 is installed in the front area of the motor vehicle, between the headlights for the passing light/high beam. A laser diode array is used in the preferred exemplary embodiment as emission source 12 that emits in the near infrared spectral region, and it emits infrared radiation 20 in the near infrared spectral region. Emission source 12 is controlled and monitored by control unit 14. From backscattered infrared radiation 22, infrared-sensitive camera 10 generates images of the surroundings 24 of the motor vehicle. Infrared-sensitive camera 10 is mounted behind the windshield of the motor vehicle in the area of the inside rearview mirror. In the preferred exemplary embodiment, infrared-sensitive camera 10 is an infrared-sensitive CMOS camera 10. CMOS camera 10 is controlled via control unit/processing unit 16. At the same time, CMOS camera 10 transmits the generated images of surroundings 24 of the motor vehicle for further processing to control unit/processing unit 16. Control unit/processing unit 16 of CMOS camera 10 and control unit 14 of emission source 12 each include at least one microprocessor to execute programs for control and/or processing.

Figure 2:
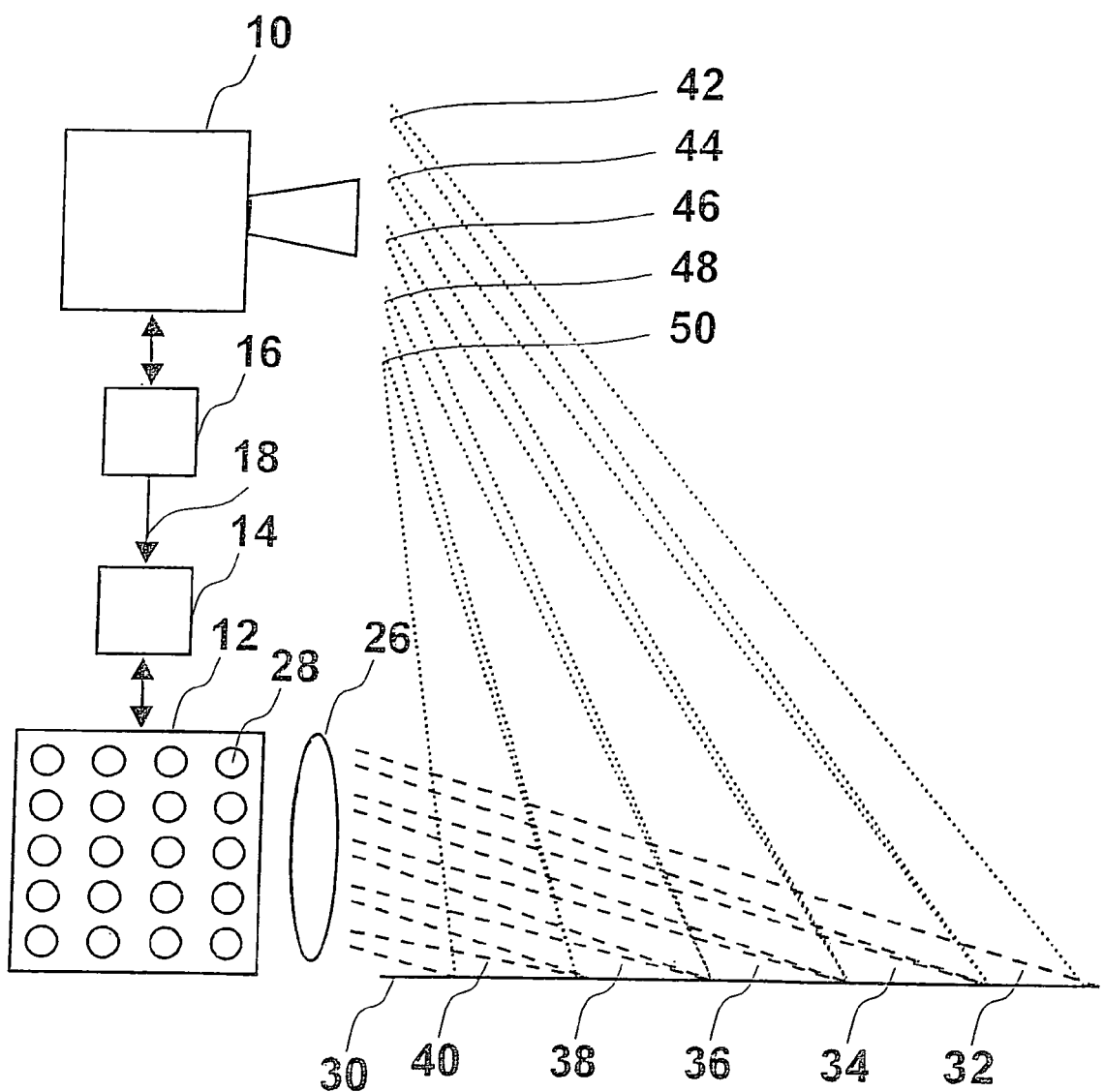
FIG. 2 shows a block diagram of the preferred exemplary embodiment.

FIG. 2 shows a block diagram of the device for generating images in a motor vehicle of the preferred exemplary embodiment. Below, we explain the components additional to the ones in FIG. 1 and the manner of functioning of the device. Emission source 12, that emits in the near infrared spectral region, is made up of a laser diode matrix having five lines of four laser diodes 28 each. Laser diodes 28 of emission source 12 generate infrared radiation at least in the near infrared spectral region, preferably in the wavelength range between 850 nm and 900 nm. Four laser diodes 28 of one row are activated in common by the row, in a pulsed manner, by control unit 14. Subsequently, the infrared radiation generated by the row is used, via an optical system 26, for the pulsed illumination of a sub-range 32, 34, 36, 38, 40 of the image recording region of CMOS camera 10. In FIG. 2, first illuminated sub-range 32, second illuminated sub-range 34, third illuminated sub-range 36, fourth illuminated sub-range 38, and fifth illuminated sub-range 40, of the image recording region are drawn in. First sub-range 32 is illuminated by the first row of emission source 12, while further sub-ranges 34, 36, 38, 40 are illuminated by rows 2 to 5 of emission source 12. In the preferred exemplary embodiment, it is achieved by optical system 26 that there is a partial overlapping of sub-ranges 32, 34, 36, 38, 40, especially for the complete illumination of the sub-ranges, so that the entire image recording region of the infrared-sensitive camera is covered by sub-ranges 32, 34, 36, 38, 40. Optical system 26 is further used for generating a homogeneously illuminated sub-range 32, 34, 36, 38, 40 from the four respective point-shaped laser diodes 28 as light sources. The rows of emission source 12 are activated one after the other by control unit 14 in such a way that the sub-ranges 32, 34, 36, 38, 40 are illuminated in a sequentially pulsed manner. In the preferred exemplary embodiment, a sub-range 32, 34, 36, 38, 40 is, in this context, an approximately rectangular region of the surroundings of the motor vehicle in the driving direction. The surroundings of the motor vehicle are, in this context, roadway 30, drawn in FIG. 2, for example. The reflected infrared radiation is recorded by infrared-sensitive CMOS camera 10. From the reradiated infrared radiation, infrared-sensitive CMOS camera 10 generates images of the surroundings of the motor vehicle and transmits the generated images to control unit/processing unit 16. In this context, CMOS camera 10 is aligned so that it includes the surroundings of the motor vehicle, for instance roadway 30 that is drawn in FIG. 2. Infrared-sensitive CMOS camera 10 is made up of individual pixels which, in the first exemplary embodiment, are situated in a matrix including 640×480 pixels. To generate an image, partial image regions 42, 44, 46, 48, 50 are recorded. The respective partial image regions 42, 44, 46, 48, 50 are drawn in FIG. 2. Partial image region 42 includes first sub-range 32, while the additional sub-ranges 44, 46, 48, 50 include corresponding sub-ranges 34, 36, 38, 40. In this context, partial image regions 42, 44, 46, 48, 50 are dimensioned so that the boundaries of the associated sub-ranges 32, 34, 36, 38, 40 are not exceeded. Thereby the complete illumination of partial image regions 42, 44, 46, 48, 50 is ensured. Using control unit/processing unit 16, the subsequently explained synchronization in time between the recording of a partial image region 42, 44, 46, 48, 50 by CMOS camera 10 and the pulsed illumination of sub-ranges 32, 34, 36, 38, 40 corresponding to partial image region 42, 44, 46, 48, 50, is controlled. In the first step, control unit/processing unit 16 activates control unit 14 via signal line 18 in such a way that laser diodes 28 of the first row of emission source 12 are activated. Thereby, sub-range 32 is illuminated by near infrared radiation. In the second step, control unit/processing unit 16 controls infrared-sensitive CMOS camera in such a way that, during the illumination of sub-range 32, the image rows of CMOS camera 10, which lie inside corresponding partial image region 42, are sequentially read in by a sample and hold circuit scanning line by scanning line. In this exemplary embodiment, these are scanning lines 1 through 96. In the third step, control unit/processing unit 16 activates control unit 14 via signal line 18 in such a way that laser diodes 28 of the first line of emission source 12 are switched off. Subsequently, steps 1 to 3 for lines 2, 3, 4 and 5 of emission source 12 and scanning lines 97 to 192, 193 to 288, 289 to 384 and 385 to 480 of infrared-sensitive CMOS camera 10 are correspondingly repeated. The generated image is finally composed of recorded scanning lines 1 to 480 of partial image regions. For the generation of further images, the procedure described above is repeated. In the preferred exemplary embodiment, 25 images are generated per second. The four laser diodes 28 of each line are accordingly operated at a cycle duration of 40 ms and a pulse duration of 8 ms. The activation of control unit 14 by control unit/processing unit 16 takes place by unidirectional or bidirectional transmission of analog and/or digital signals. In one alternative variant, signal line 18 is a communications bus in a motor vehicle, for instance, a CAN bus.

FIG. 3 shows in each case a time diagram, for the preferred exemplary embodiment, of the irradiation level of pulse-wise illuminated sub-ranges 32, 34, 36, 38, 40 of the surroundings of the motor vehicle. FIG. 3 reflects the variation with time, in principle, of the irradiation level of pulse-wise illuminated sub-ranges 32, 34, 36, 38, 40. On the abscissas of FIGS. 3a, 3b, 3c, 3d and 3e, time t is plotted in each case. The irradiation level is defined as radiation power per area. FIG. 3a shows the time characteristic of the irradiation power of pulse-wise illuminated sub-range 32, corresponding to the block diagram as in FIG. 2. Sub-range 32 is illuminated for about 8 ms at a period of 40 ms. FIGS. 3b, 3c, 3d, 3e correspondingly show the time characteristic of the irradiation level of additional sub-ranges 34, 36, 38, 40, as in FIG. 2. The pulsed illumination of these sub-ranges 34, 36, 38, 40 also takes place at a period of 40 ms and a pulse duration of 8 ms. As may be seen from FIG. 3, the pulsed illumination takes place sequentially beginning at sub-range 32, via sub-ranges 34, 36, 38 to sub-range 40. After the pulsed illumination of sub-range 40, the pulsed illumination begins over again at sub-range 32.

In a first variant of the preferred exemplary embodiment, the scanning lines of CMOS camera 10 are not read in sequentially, scanning line for scanning line, but rather all scanning lines of a partial image region are read in parallel. In the preferred exemplary embodiment this means that, for example, in the first step, scanning lines 1 to 96 are read in one parallel step, simultaneously by one sampling procedure.

In an alternative variant, using the laser diode array used in the preferred exemplary embodiment, sub-ranges 32, 34, 36, 38, 40 according to FIG. 2 are also illuminated in a pulsed manner. In this variant, however, during each sampling procedure of a scanning line the corresponding sub-range 32, 34, 36, 38, 40 is respectively illuminated in a pulsed manner. This has the result, for example, that, for recording partial image region 42, sub-range 32 is illuminated altogether by 96 consecutive light pulses. At each light pulse for illuminating sub-range 32, scanning lines 1 to 96 are sequentially read in one sampling procedure. In this context, the pulsed illumination of sub-range 32 is synchronized in time with the sampling procedure of all 96 scanning lines of first partial image region 42, and correspondingly for all further sub-ranges 34, 36, 38, 40. The recording of a sub-range 42, 44, 46, 48, 50, as in FIG. 2, takes approximately 8 ms at a cycle duration of 40 ms. Within the 8 ms it takes to record partial image region 42, 44, 46, 48, 50, individual light pulses having a light pulse duration of about 120 ns at a cycle duration of the light pulses of about 83 ps are generated. These light pulses are synchronized in time with the sampling procedure of a corresponding scanning line.

In one additional variant, a laser diode array is used that is changed from the one in the preferred exemplary embodiment. The laser diode array used in this variant has 480 lines using about 100 laser diodes per line, in each case. The laser diodes used are miniaturized. There is an identity between the number of lines of the laser diode array and the number of scanning lines of the CMOS image sensor used. The optical system used is constituted in such a way that a vertical illumination range of 1° is achieved per line. In the horizontal direction, the illumination range is extended, so that, overall, a linear illumination of the surroundings of the motor vehicle takes place. Depending on the number of lines of the laser diode array, 480 sub-ranges are generated for the pulsed illumination. In the case of a pulsed illumination of a sub-range by a line of the laser diode array, the partial image region corresponding to the sub-range is recorded for this. In this variant, a partial image region is a scanning line of the CMOS image sensor. Each sub-range is illuminated using a light pulse duration of approximately 80 ns and a cycle duration of 40 ms. Thus, there there is a duty cycle of pulse duration to pulse period of 0.000,002. The sampling procedure for on a scanning line lasts approximately 120 ns. In this context, the light pulse is time-wise synchronized in time with the sampling procedure in such a way that the light pulse lasting 80 ns is generated approximately in the middle of the sampling procedure of the scanning line lasting 120 ns. The control of the lines of the laser diode array is performed in such a way that the generated illumination sweep takes place synchronously with the scan sweep of the CMOS image sensor.

In one further variant of the device and the method described above, generally at least one infrared-sensitive camera is used which has means for recording partial image regions, in particular scanning lines. In one variant, besides an infrared-sensitive camera, at least one additional infrared-sensitive camera is used, especially at least one infrared-sensitive CMOS camera. Besides the matrix size of the camera of 640×480 pixels used in the above exemplary embodiment, in additional variants, infrared-sensitive cameras are used having a matrix size of, for instance, 1024×768 pixels and/or 1280×1024 pixels.

Alternatively, in additional variants of the exemplary embodiments described above, instead of scanning lines, scanning columns are recorded. Accordingly, the partial image regions and the sub-ranges, instead of being spatially extended in the horizontal direction, are correspondingly extended in the vertical direction. The corresponding applies to the laser diode array which, in these variants, is activated column-wise to pulsed illumination. In general, additional variants are possible of subdivision and number of sub-ranges and partial image regions. The only assumption is that the subdivision and the number of sub-ranges and partial image regions is selected in such a way that at least one sub-range may be allocated to each partial image region, this at least one sub-range at least includes the partial image region. Furthermore, it is necessary that a synchronization in time between the recording of a partial image region and the pulsed illumination of the sub-range at least including the partial image region is able to be carried out. Besides the synchronization in time, this makes possible a sort of spatial synchronization between the pulsed illumination of at least one sub-range and the at least one corresponding partial image region.

In one variant of the exemplary embodiments and the variants described above, the at least one infrared-sensitive camera and the at least one control unit/processing unit of the camera form a unit. Alternatively or in supplement, the at least one emission source radiating at least in the near infrared spectral region and the at least one control unit of the emission source are a unit.

One variant of the device and method described above, besides using the laser diode array radiating in the near infrared spectral region, uses at least one additional emission source radiating in the near infrared spectral region. Alternatively or in supplement, at least one laser array radiating in the near infrared spectral region is used. In general, at least one emission source that radiates in the near infrared spectral region is able to be used, which is suitable for the pulsed illumination of sub-ranges and for synchronization in time of the illumination with the recording of partial image regions of a camera.

The synchronization in time of the recording of a partial image region with the pulsed illumination of the at least one sub-range, that includes the partial image region, takes place in different variants of the exemplary embodiments described in a scanning line-wise and/or partial image region-wise and/or sub-range-wise and/or image-wise and/or image sequence-wise manner. In a scanning line-wise synchronization in time, synchronization signals are generated for each scanning line. By contrast, in the partial image region-wise synchronization in time, corresponding synchronization signals are generated for each partial image region. An analogous procedure follows for the sub-range-wise synchronization in time. In one additional variant, the synchronization in time takes place image-wise. This type of synchronization takes place by image synchronization pulses. In one additional variant, the synchronization in time is carried out image sequence-wise. This means that an image sequence synchronization pulse is generated, for example, after ten images. For the synchronization in time of the pulsed illumination of at least one sub-range and/or the recording of at least one partial image region, it is possible to use timing pulse generators in the control unit of the emission source and/or in the control unit/processing unit of the camera. Quartzes, for instance, are used as timing pulse generators.

Possible phase shifts between the pulsed illumination of sub-ranges of the image recording range of the camera and the recording, to be synchronized in time, of the scanning lines are adjusted by an adjustable displacement in time with respect to one another. As cause of the phase shift one might name time delays in the generation of light pulses and running time delays of the light pulse. This displacement may be set fixedly, specific as to type, that is, as a function of the individual components used, or it is ascertained via an image quality measure. The image quality measure is ascertained via an image evaluation in the control unit/processing unit of the infrared-sensitive camera via the brightness of the image and/or the brightness gradient in the image edges, that is, in the direction from the first scanning line to the last scanning line. The displacement in time is set optimally as a function of the image quality measure ascertained, via an appropriate regulation.

What is claimed is:

1. A device for generating an image in a motor vehicle, comprising:
    at least one infrared-sensitive camera for generating at least one image of surroundings of the motor vehicle;
    at least one emission source radiating at least in a near infrared spectral region for a pulsed illumination of sub-ranges of image recording regions of the at least one infrared-sensitive camera; and
    an arrangement for recording the at least one image in partial image regions and for carrying out a synchronization in time of a recording of a partial image region with the pulsed illumination of the sub-range that at least includes the partial image region;
    wherein the at least one emission source includes at least one of a laser array and a laser diode array; and
    wherein rows of the at least one emission source are activated one after the other so that the sub-ranges of the image recording regions are illuminated in a sequentially pulsed manner.

2. The device as recited in claim 1, wherein the partial image regions include at least one of a scanning line and at least one scanning column of the at least one infrared-sensitive camera.

3. The device as recited in claim 1, wherein the at least one infrared-sensitive camera includes at least one infrared-sensitive CMOS camera.

4. A method for generating an image in a motor vehicle, comprising:
    providing at least one infrared-sensitive camera for generating at least one image of surroundings of the motor vehicle;

providing at least one emission source radiating at least in a near infrared spectral region and illuminating in a pulsed manner sub-ranges of image recording regions of the at least one infrared-sensitive camera; and recording the at least one image in partial image regions, the recording of a partial image region being synchronized in time with the pulsed illumination of the sub-range that at least includes the partial image region;

wherein the at least one emission source includes at least one of a laser array and a laser diode array; and wherein rows of the at least one emission source are activated one after the other so that the sub-ranges of the image recording regions are illuminated in a sequentially pulsed manner.

5. The method as recited in claim 4, wherein during the recording of the partial image regions, the corresponding sub-range of the image recording region of the at least one infrared-sensitive camera is illuminated in a pulsed manner.

6. The method as recited in claim 4, wherein at least one sub-range of the image recording region of the at least one infrared-sensitive camera includes at least two partial image regions.

7. The method as recited in claim 6, wherein at least one of the following is satisfied:

for the recording of at least one partial image region, the corresponding sub-range of the image recording region is illuminated in a pulsed manner at least once, and in a pulsed illumination of a sub-range of the image recording region, at least two partial image regions are recorded.

8. The method as recited in claim 7, wherein in a pulsed illumination of the sub-range all partial image regions including the sub-range are recorded.

9. The method as recited in claim 4, wherein the partial image regions include at least one of a scanning line and at least one scanning column of the at least one infrared-sensitive camera.

10. An infrared-sensitive camera for generating at least one image, comprising:

a recording arrangement for recording the at least one image in partial image regions; and a synchronizing arrangement for carrying out a synchronization in time of the recording of the partial image regions with a sub-range, of an image recording region of the infrared-sensitive camera, which includes at least the partial image region and is illuminated in a pulsed manner at least in the near infrared radiation spectrum by at least one of a laser array and a laser diode array;

wherein rows of the at least one emission source are activated one after the other so that the sub-ranges of the image recording regions are illuminated in a sequentially pulsed manner.

11. The infrared-sensitive camera as recited in claim 10, wherein the partial image regions include at least one of a scanning line and at least one scanning column of the infrared-sensitive camera.

12. The method as recited in claim 4, wherein the at least one infrared-sensitive camera includes at least one infrared-sensitive CMOS camera.

13. The infrared-sensitive camera as recited in claim 10, wherein the infrared-sensitive camera includes an infrared-sensitive CMOS camera.

14. The infrared-sensitive camera as recited in claim 10, wherein at least one sub-range of the image recording region of the at least one infrared-sensitive camera includes at least two partial image regions.

15. The infrared-sensitive camera as recited in claim 14, wherein at least one of the following is satisfied:

for the recording of at least one partial image region, the corresponding sub-range of the image recording region is illuminated in a pulsed manner at least once, and in a pulsed illumination of a sub-range of the image recording region, at least two partial image regions are recorded.

16. The infrared-sensitive camera as recited in claim 15, wherein in a pulsed illumination of the sub-range all partial image regions including the sub-range are recorded.

17. The infrared-sensitive camera as recited in claim 10, wherein the partial image regions include at least one of a scanning line and at least one scanning column of the at least one infrared-sensitive camera.

* * * * *